US009181518B2

(12) United States Patent
Fiset

(10) Patent No.: US 9,181,518 B2
(45) Date of Patent: *Nov. 10, 2015

(54) PHOTONIC WINE PROCESSOR

(71) Applicant: Peter Depew Fiset, Loudenville, NY (US)

(72) Inventor: Peter Depew Fiset, Loudenville, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/186,221

(22) Filed: Feb. 21, 2014

(65) Prior Publication Data

US 2014/0231672 A1    Aug. 21, 2014

Related U.S. Application Data

(63) Continuation of application No. 13/507,305, filed on Jun. 18, 2012, now Pat. No. 8,692,210, and a continuation-in-part of application No. 12/928,628, filed on Dec. 15, 2010.

(60) Provisional application No. 61/284,253, filed on Dec. 15, 2009, provisional application No. 61/520,881, filed on Jun. 15, 2011.

(51) Int. Cl.
*A61L 2/10* (2006.01)
*C12H 1/16* (2006.01)
*A23L 3/28* (2006.01)
*A23L 1/025* (2006.01)

(52) U.S. Cl.
CPC .............. *C12H 1/165* (2013.01); *A23L 1/0252* (2013.01); *A23L 3/28* (2013.01)

(58) Field of Classification Search
USPC .............. 250/453.11, 454.11, 455.11, 504 R; 422/1, 22, 24, 25, 28
See application file for complete search history.

(56) References Cited

U.S. PATENT DOCUMENTS

| | | |
|---|---|---|
| 3,037,116 A | 5/1962 | Weber |
| 3,787,587 A | 1/1974 | Weber |
| 3,878,386 A | 4/1975 | Douglas |
| 4,034,213 A | 7/1977 | Norris |
| 4,162,129 A | 7/1979 | Bartholemew |
| 4,344,113 A | 8/1982 | Ditto |
| 4,494,452 A | 1/1985 | Barzs |
| 4,785,724 A | 11/1988 | Vassallo |
| 4,858,084 A | 8/1989 | Sheryl |
| 4,922,355 A | 5/1990 | Dietz |
| 4,952,369 A | 8/1990 | Belilos |
| 5,070,435 A | 12/1991 | Weller |
| 5,119,279 A | 6/1992 | Makowsky |
| 5,211,699 A | 5/1993 | Tipton |
| 5,293,912 A | 3/1994 | Wildash |
| 5,441,179 A | 8/1995 | Marsh |
| 5,446,289 A | 8/1995 | Shodeen et al. |
| 5,595,104 A | 1/1997 | Delaplaine |
| 5,879,068 A | 3/1999 | Menashrov |
| 5,920,075 A | 7/1999 | Whitehead |
| 6,010,727 A | 1/2000 | Rosenthal |
| 6,287,614 B1 | 9/2001 | Peiffer |
| 6,332,706 B1 | 12/2001 | Hall |
| 6,508,163 B1 | 1/2003 | Weatheril |
| 6,557,459 B1 | 5/2003 | Phelps |
| 7,299,743 B2 | 11/2007 | Moore |
| 7,311,411 B2 | 12/2007 | VanderSchuit |
| 7,401,935 B2 | 7/2008 | VanderSchuit |
| 7,543,717 B2 | 6/2009 | Hinkle |
| 7,614,614 B2 | 11/2009 | Sabadicci |
| 8,692,210 B2 * | 4/2014 | Fiset ................. 250/455.11 |
| 2004/0219056 A1 | 11/2004 | Tribelsky et al. |
| 2004/0222224 A1 | 11/2004 | Plester |
| 2009/0269240 A1 | 10/2009 | Tanaka |
| 2011/0081274 A1 | 4/2011 | Packman et al. |

OTHER PUBLICATIONS

Non-Final Office Action for U.S. Appl. No. 12/928,628, dated Jun. 13, 2013.
Final Office Action for U.S. Appl. No. 12/928,628, dated May 30, 2014.
Restriction Requirement for U.S. Appl. No. 12/928,628, dated Nov. 15, 2012.
Non-Final Office Action for U.S. Appl. No. 13/507,305, dated Aug. 9, 2013.
Notice of Allowance for U.S. Appl. No. 13/507,305, dated Nov. 22, 2013.
Non-Final Office Action for U.S. Appl. No. 12/928,628, dated Mar. 19, 2015.
Salcedo, et al., "Photoreactivation and Dark Repair in UV-Treated Microorganisms: Effect of Temperature," Applied and Environmental Microbiology, 73(5)1594-1600, 2007.
Hartley, "The Effect of Ultraviolet Light on Wine Quality", Wrap, ISBN:1-84405-386-5, 24 pages, May 2008.

* cited by examiner

*Primary Examiner* — Nicole Ippolito
(74) *Attorney, Agent, or Firm* — Carolyn S. Elmore, Esq.; Darlene A. Vanstone, Esq.; Elmore Patent Law Group, P.C.

(57) ABSTRACT

An apparatus and method for modifying the organoleptic properties of a beverage, such as wine in a bottle, said apparatus having a least one light-source, said light-source applying peak wavelengths at intensities and time durations optimal for modifying said beverage's organoleptic properties with a highly reflective inner surface, a translucent air flow baffle, a translucent liquid barrier, and a controlled oxygen concentration in the bottle headspace.

16 Claims, No Drawings

PHOTONIC WINE PROCESSOR

CROSS-REFERENCE TO RELATED APPLICATIONS

This application is a continuation of U.S. Ser. No. 13/507,305, filed Jun. 18, 2012, which is a continuation-in-part and claims the benefit of U.S. Non-Provisional patent application Ser. No. 12/928,628 filed on Dec. 15, 2010 by the present inventor which is incorporated herein by reference in its entirety. This application also claims the benefit of U.S. Provisional Patent Application Ser. No. 61/284,253 filed on Dec. 15, 2009 by the present inventor, which is incorporated herein by reference in its entirety. This application also claims the benefit of U.S. Provisional Patent Application Ser. No. 61/520,881 filed on Jun. 15, 2011 by the present inventor, which is incorporated herein by reference in its entirety.

FEDERALLY SPONSORED RESEARCH

Not Applicable

SEQUENCE LISTING

Not Applicable

BACKGROUND OF THE INVENTION

Field of the Invention

The present invention relates to processing food and beverages, and more particularly to an apparatus and method capable of modifying at least one organoleptic property of a food or beverage by controlled exposure to wave energy in the form of light with energy on the order of about 1 KJ/L to about 10000 KJ/1, at peak wavelengths longer than 350 nanometers, with advanced user interface, process controls, and methods to modify pH, ORP, chemical composition, and increase ethyl acetate concentration, and/or decrease 2-methoxyphenol ("guaiacol") concentration.

SUMMARY OF THE INVENTION

The photonic wine processor ("Processor") is useful for treating one or more beverages with light including, but not limited to, ethanolic beverages, alcoholic beverages, fermented beverages, raw ethanolic distillates, wine, port wine, sherry, liquor, grain alcohol, vodka, gin, brandy, whiskey, bourbon, tequila, rum, coffee, and juices.

It is widely reported that the human sensory responses are due in part to activation of Transient Receptor Potential ("TRP") channels.

The TRPV1 channel is a specific TRP channel related to taste and the burning sensation produced by piquant foods including, but not limited to, foods with capsaicin above a perception threshold, jalapeno peppers.

A TRP channel related to TRPV1 is the TRPA1 channel. The TRPA1 channel activation is responsive to environmental conditions including, but not limited to, temperature, mechanical stretching, and concentrations of certain combinations of TRPA1 agonist found in food and beverages. TRPA1 channel activation is indicated in sensations including the burning sensation resulting from temperature extremes.

Alcoholic beverages produce varying degrees of a characteristic burning sensation when consumed. An alcoholic beverage that produces a significant burning sensation is commonly associated with the term "rough". An alcoholic beverage that produces a low burning sensation is commonly associated with the term "smooth". It is useful to provide a method to manipulate the burning sensation in a food, since many consumers make decisions based on combinations of one or more product attribute including, but not limited to, roughness, smoothness, degree of burning perception.

Without being bound by the theory, I think that the process is modifying combinations of one or more of the concentration of compounds including, but not limited to, TRPV1 agonists, TRPA1 agonists, acrolein, or acetaldehyde.

Note: The term alcoholic beverage, unless otherwise specified, are considered herein to have ethanol as the highest concentration alcohol. Alcoholic beverages are also referred to as ethanolic beverages.

Actinic light produces free radicals and reactive oxygen species in gas, liquid, and solid phases. Reactive oxygen species oxidize aldehydes to produce acids. Acids react with alcohols and produce esters. Ester tend to have fruity flavor and smells. Also esters tend to polymerize to polyesters under actinic light. Polyester and polymerized compounds tend to have less flavor and a softer mouthfeel. The actinic light used in the process provides energy to polymerize polymerizing compounds including, but not limited to, esters.

Certain compounds in the vanilloid family of compounds are TRPV1 agonists, including, but not limited to, capsaicin. Capsaicin is not normally encountered in a high enough concentration in wine, and distilled spirits to be noticeable. Some beverages manufactures increase the capsaicin concentration purposefully.

Transient Receptor Potential ("TRP") channels in general and the TRP involvement with the perception of environmental stimulus, including temperature, and flavors.

Acrolein and acetaldehyde are reported to be TRPA1 agonists. The actinic light increases the potential of oxidation reactions involving acrolein and acetaldehyde by the production of reactive oxygen species in aqueous solution leading to an increase in carboxylic acid concentrations which results in a lower pH.

The lower pH trend has been measured and is reported in Table 1 herein to be a common response of the light sensitive foodstuff, which supports the theory that carboxylic acids are produced from aldehydes by the Processor operating methods.

The methods of transformation upon exposure to light is very complicated and the present invention does not imply a limitation of the use of the present invention to any subset of responses. Rather the example are included herein to describe a subset of the possible outcomes.

DETAILED DESCRIPTION

The Processor method includes a) turning on the Processor, b) turning off the Processor before too much processing occurs. Too much processing can produce off-flavors and it is an important step to avoid over processing.

The piquancy of certain beverages (Bourbon, Vodka, Whiskey, Brandy, Tequila) has been shown to decrease with increasing exposure in most instances.

TRPA1 agonists acrolein (ethylene aldehyde), acetaldehyde, and cinnamaldehyde which are known constituents in ethyl alcohol beverages are considered off-flavors and are intended to be reduced by fractional distillation process by partially separation and discarding the "head cut" as the lightest distillates. A portion of the acrolein and acetaldehyde remains in the "heart cut" which is the portion of the fractional distillate that is the basis of the consumable product.

Lower cost beverages tend to have more off-flavors because the manufacturer discards less of the headspace.

The most common off-flavor producing component is acetaldehyde, and the present invention process decreases the acetaldehyde concentration by proving oxidation mechanism to transform the acetaldehyde into acetic acid, and a secondary oxidation of acetic acid into ethyl acetate.

Actinic light increases the available total energy to increase kinetics of chemical reactions. Considering the well known kinetic rate of reaction equation (Arrhenius Equation) the temperature does not change significantly in the Processor, which implies that the energy of activation is lower in an environment with more available photons as is found the Processor chamber.

Aqueous solution chemistry theory: Aldehyde oxidizes to carboxylic acid. Carboxylic acid reacts with alcohol to produce ester. For example, acetaldehyde oxidizes to acetic acid. Acetic acid reacts with ethanol to produce ethyl acetate.

Ethyl acetate production by the Processor limits the practical limits of use of the Processor to a range that has an ethyl acetate concentration lower than a perception threshold of 120 mg/L.

Head-space chemistry theory: Alcohol vapor oxidizes to aldehyde in headspace. Aldehydes partial vapor pressure increases in the head-space and are absorb into solution.

In general the Processor promotes aldehydes oxidizing to a carboxylic acids which reduces acetaldehyde ("ethyl aldehyde"), cinnamaldehyde, and propenal ("ethylene aldehyde") reduces the activation of TRPA1 channels which have been reported to be involved with the burning mouth-feel. The carboxylic acids lower the pH as has been measured in the following table. in general carboxylic acids react with alcohols to form an esters which increase the fruit-like flavors.

There is a need for a Processor operator to be able to confirm that the Processor has actinic light within the conversion chamber. To provide a useful benefit of one or more indicator ports to measure the intensity of the light in the conversion chamber through combinations of one or more light measurement system including, but not limited to, a visual light measurement system, and an electronic light measurement system.

The visual light measurement system preferably modulates the wavelength of the transmitted light emitted to the observer using a visual indicator optical path modulation system including, but not limited to, a fluorescence capable material for a conversion of a portion of the wavelength range shorter than 400 nm to a wavelength longer than about 400 nm, and an optical long pass filter to reduce or substantially eliminate wavelength shorter than about 400 nm. As an example, the fluorescence capable material is a combination of one or more materials including, but not limited to, paper, bleached paper, ink, fluorescent ink.

The electronic light measurement system is comprised of one or more electronic light measuring systems components including, but not limited to, semiconductor, phototransistor, photodiode, photoresistor, or external emission to provide a useful function including, but not limited to, the function of providing an indicator of the operational condition of the Processor's active light source.

In an alternate embodiment of the invention, the indicator ports include a shutter capable of controlling the amount and direction of the actinic light. For example, when the visual indicator is not in use the shutter would preferably close and include a substantially actinic light reflective surface to reflect the actinic light back toward the processing chamber to provide one or more useful purposes including, but not limited to, increasing the efficiency of the actinic light source.

There is a need to determine if the lamps are functioning and modify the power to the lamp to make a consistent processing time or to modify the processing time to the output of the lamps. The dose of the lamps power integrated over time is the dose of the Processor and the assumption being that the dose measured in Joules has a first order linear relationship.

In most embodiments the processing time is the most controllable attribute but has the disadvantage of not providing the user of a consistent response. The lamp intensity is also controllable to a lesser degree than time and the lamp intensity control range varies by lamp technology. A Light Emitting Diode ("LED") has a more controllable intensity range than fluorescent bulbs which are more controllable than Compact Fluorescent Lamps ("CFL"). CFL technology have a ballast integrated into the Processor and therefore have a fixed response to mains power supply frequency in cycles per second ("Hz") and voltage. Therefore an irradiance measurement from a light detector is used to control the dose according to a function defined in a controller.

A simple window with a fluorescent film provides a port from which the user can determine the operational status of the Processor. The most useful indication is to determine if the lamps are emitting light when the lamp power is applied.

For example, if a bottle of a beverage were placed in the Processor on a hot day and the ambient temperature was higher than the Processor recipe called for, then a user interface would be activated indicating the condition allowing for the operator to either remove the bottle or alternatively to delay the start of the processing until the ambient temperature was within the allowed processing range.

The Processor's fault controller will delay start until all start conditions are met or exceeded. Operate until a fault condition exists. Halt until conditions are met. Conditions include suitable ambient temperature available or other condition met. Accumulate process time over multiple sub-sequences with suitable operating conditions are met. Operate the cooling system past process end to allow time to cool bulbs off to avoid additional bottle temperature rise for either a set time or until the light source temperature reaches ambient plus a cool-off-margin offset temperature.

An alternate embodiment of the present invention uses differing methods to cool the lamps and the liquids; e.g., forced air to cool the lamps, and liquid cooling to cool the beverage.

An alternate embodiment of the invention incorporates one or more electrical hazard safety component including, but not limited to, ground fault current interrupter ("GFCI"), ground fault interrupter ("GFI"), appliance leakage current interrupter ("ALCI"), safety switches, trip switches, residual current circuit breaker with overload protection ("RCBO"), residual current processor. The electrical hazard safety component is useful in operating an environment containing involving electrically conducting solids or liquids in the proximity of an electrical appliance, as is the case with the present invention. The alternate embodiment provides a grounded wire electrically connected to the metal enclosure and to the ground wire of the electrical hazard safety component.

The preferred materials incorporated in the invention are one that do not add fuel to a fire including, but not limited to, metal, glass, PVC wire, semiconductors, ceramics. For example, a 5 gallon pail serves as an enclosure platform to build the invention. However, a metal enclosure such as a 5 Gallon metal pail with metal lid servers is preferred over a 5 Gallon plastic pail with plastic lid for use as an enclosure platform.

The enclosure platform has combination of one or more holes cut to provide port including, but not limited to, port for inserting a bottle, port for extracting a bottle, port to for coolant inflow, port for coolant outflow, port for gaseous coolant inflow, port for gaseous coolant outflow, port for air coolant inflow, port for air coolant outflow, port for liquid coolant inflow, port for liquid coolant outflow, port for power, port for electrical power, port for communication, port for networking, port for controls, port for visual indicator of operational status.

The port to insert a bottle has a smaller minimum dimension than the bottle processing volume processing minimum dimensions because coolant flow space is required to exist near the bottle surface area.

If the bottle insertion port were not restrictive to a smaller dimension than the bottles processing dimensions then there could be a problem with coolant flow around the bottle.

It is common for retail products to be shipped in non-circular containers.

Non-circular inserts are used to adapt the Processor to process non-circular containers.

When a bottle is not recommended for use in the Processor, then the method to overcome this limitation is to a) open the bottle, b) transfer the beverage to a bottle compatible with the Processor, c) process the beverage in the compatible bottle, d) use the compatible bottle or transfer the processed beverage back to the original container.

An alternate embodiment of the present invention incorporates a catch-basin of sufficient volume to collect the liquid contents from a broken bottle of the maximum volume of bottle allowed in the Processor. For example, a sufficient volume would be as large or larger than the volume needed to keep the liquid from contacting any active electrical components incorporated within the Processor. An advantage of the catch-basin is to reduce or substantially eliminate external spills which might leave a stain the local environment. Another advantage of the catch-basin is to eliminate or substantially reduce electrical hazards due to liquid in the Processor containing an electrically active component.

Alternate embodiments of the present invention incorporates a spigot for the catch-basin to release beverage.

Alternate embodiments of the present invention incorporates washable components such that a spill can be cleaned to increase the efficiency of the Processor at exposing the target foodstuff to light.

Alternative embodiments of the present invention incorporate combinations of one or more liquid detectors including, but not limited to, air gap capacitance change detector, weight change detector. The useful purpose of the liquid detector is to provide a signal to the fault detection controller to turn off the electrical power to the Processor lower the risk of electrical hazards.

Alternative embodiments of the present detector incorporate an tilt detector to reduce the hazards associated with operating the Processor in an non-preferred orientation.

An alternate embodiment of present invention incorporates a fault detection controller which is responsive to one or more fault signals including, but not limited to, tilt detector, spilled liquid, unexpected weight change, over-voltage, over-current, temperature out of range. The fault detection controller turns the reduces the power or turns power off.

The preferred embodiment of the present invention provides an air inlet port below the air outlet port in order to use convection of heated air increase the heat removal. For example, this is especially important in conditions where the active cooling fails and the fault detector fails to turn the power off, then it is important that at air is naturally convected to lower the overall temperature of the run-away Processor.

There is a need to process beverage evenly over the volume for consistent and predictable results. Performing the processing on 750 ml and 1.5 Liter ("L") bottle allows for the consistent treatment because the light penetrates the bottles and the liquid is mixed by vibration, shaking, or stirring. An atypical recipe would call for uneven processing for increase complexity of results.

When there is only one container available, then a barrier can be incorporated to split a container into two sections using one or more bladders to keep process liquid separate from unprocessed liquid. Make use of multiple containers to separate the processed liquid from the unprocessed liquid.

In large containers the light does not penetrate fully or evenly and therefore an advantage is to have multiple containers, or have 1 or more bladder within the container to partition the beverage into more processed and less processed partitions. Alternatively, if the batch is not finished then the beverage could be switched from bladder 2 back to bladder 1 in whole or in part, iterate method as needed. Using a partitioned container to move processed beverage back and forth lowers the risk of over-processing portions of the beverage that would increase the statical likelihood that portions of the total beverage volume would recycle more than other portions standard deviation of beverage portions in the process. Partitioning the volume lowers the standard deviation of portions having too much or too little processing. The bladder allows the process to be performed on a single tank instead of requiring multiple tanks to partition the beverage.

A temporary partition in one embodiment is a bag style where the bag expands as the process flow into the partition. In another embodiment the temporary partition is has an edge seal that conforms to the wall of the tank and slides to change the volume of beverage held in the partition.

The pressure to create fluid flow through the Processor is from pressurizing devices including, but not limited to, pumps, gravity. Gravity can be from elevation or from the weight of the sealed partition.

The Processor cooling system is a combination of one or more cooling system including, but not limited to, passive cooling, and active cooling. The active cooling systems included combination of one or more active cooling system components including, but not limited to, forced-air, forced-liquid, refrigeration cycles, thermoelectric devices, Peltier devices, and thermionic devices.

Liquid-Cooling Per Bottle

Liquid-Cooling System: Air cooling is useful when the ambient air is low enough to provide a heat sink. The minimum forced-air ambient temperature is the temperature at which forced air convection is not required to keep the temperature of the beverage within the preferred temperature range. Ambient temperatures lower than the minimum forced-air ambient temperature would trip a control alarm to inform the operator that a minimal temperature condition was reached, at which point the processing would automatically stop and additional processing would not start until the minimum forced-air ambient temperature was exceeded. The control system would halt the accumulation of processing time control variable for that recipe step. The control system would also wait to start processing until the ambient temperature was in a range that the available forced air cooling could handle. The available forced air cooling has a default capacity which the control system could calibrate and monitor the capacity of the cooling system to control, and the control system would adjust the allowable ambient temperature range to proceed with any step of the processing.

Unless otherwise described processing is done without distinction to liquid and headspace when in a bottle. If the entire bottle fits in the Processor, then the headspace and the liquid are processed. There are situations where the headspace and the liquid produce improved results when processed separately. In general, chemical reactions and reaction rates vary depending on gaseous, liquid, or solid phases. In additional concentrations of chemical compounds vary in the different phases of a chemical system. An advantage to process the different phases using different recipes. Therefore, in an alternate embodiment of the invention the lights in close proximity to the headspace are not the same type as the lights in close proximity to the liquid phase.

In general, the Processor makes every effort to not add chemicals to the beverage. However, this does not mean that normal chemical additions are not allowed unintentionally, as through a leaky cork, or intentionally, as in mixing prior to, or during processing. While the invention is capable of operating on target beverages without the addition of, or loss of, molecular mass, it is an object of the present invention to operate on a varying mass and of varying chemical concentrations.

A particular operating method of the present invention is referred to herein as the Headspace Processing Method ("HPM"). The purpose of the HPM is to provide a suitable headspace before the exposure method, during, and after the control the pressure and chemical composition of the headspace reduce or substantially eliminate headspace of the bottle. First determine the type of The composition of the headspace a the diatomic oxygen ('O2') molecules from the beverage container. When O2 is present in the headspace there is a tendency for additional aldehyde formation from the oxidation in the headspace. The processing of the liquid to lower the concentration of aldehydes, including acetaldehyde, and propenal through oxidation of the aldehydes in solution is a purpose of this invention.

Since O2 and alcohols co-exist in the headspace there aldehyde formation in the headspace. The actinic light increases the available energy for aldehyde to form from gaseous O2 and vapor phase alcohols in the headspace. In an alternate embodiment of the present invention a shroud is placed over the bottle to reduce or substantially eliminate the direct exposure of the headspace to the actinic light. In some cases the beverage manufacturer provides a wrapper over the headspace that has an substantially equivalent effect as a shroud in the reduction or substantial elimination of headspace exposure. The recipe would include a suggestion for replacing, deforming, or removing the manufacturer supplied headspace shroud in a manner suitable for the recipe.

The removable headspace shroud is selected from a set of Headspace Shroud with one or more suitable Headspace Shroud properties to improve the likelihood of meeting the recipe suggested processing method. The set of Headspace Shroud vary in Headspace Shroud properties including but not limited to size, spectral reflectivity, or spectral transmission.

Methods of Processor operation include steps: a) the operator looks up the recommendation for the particular bottle by referring to an operating guide or by using a smart-phone to scan a bar code with an app that requests a remote service to query combination of one or more databases including, but not limited to, beverage databases, personal preferences databases, and recommendation databases, b) the operator selects to automatically download the recipe into the Processor or manually enter the recipe, c) the operator modifies the recipe prior to starting the process. A suggested operating mode is supplied as a response to the request which includes suggested processing methods including, but not limited to, a recipe.

An example of a Processor recipe describing a method of use, is the method of using the apparatus to lower the level of burning sensation in a foodstuff by applying specific energy sources that result in a change in the level of burning sensation.

The vacuum removes headspace and modifies it and compresses it, and it compresses it and modifies it or combinations of both. Additional gases can be introduced into the headspace. Helium ("He") and nitrogen ("N2") is effective at eliminating additional O2 in the headspace.

A method of indicating process state is to place a photosensitive label on the bottle cap to provide a visual indicator of the total accumulated exposure. The photosensitive labels are well-known in the prior art for use as a skin tanning aid to determine accumulated exposure to ultraviolet light.

Port wine produced an excellent change. There is a chemical in port wine which is increased which makes the Processor very useful for accelerated aging.

Wine with certain cloudy characteristic can be substantially cleared with the Processor.

Table 1 is a table of values for pH versus time in hours for sample retail products processed in 16×BLB with air in the headspace. The pH meter was Hanna Instruments pH/ORP meter was calibrated using 4 pH and 9.86 pH. This is an example of pH trends which indicate that pH tends to get lower when air is in the headspace. Sample1 is a whiskey, Sample2 is a high-quality 100% agave tequila, Sample3 is value-line tequila. Sample1, Sample2, and Sample3 are all 40 percent ethanol by volume and brown liquors, had air in the 40 milliliter headspace in the approximately 200 milliliter clear glass bottles. The samples were processed together in the Processor at about 25 degrees Celsius and about 31 Watts of light with a peak at 365 nanometers. A portion of the liquid was removed to test with the pH meter and then replaced for further processing. Without being bound by exceptions to the overwhelming trend indicating that ethanolic beverages decrease in pH with exposure to the inventions actinic light.

As the accumulated dose increases the pH decreases linearly initially. Over time the rate of decrease decreases, until there is no longer substantial decrease in pH for additional processing at which time the chart pH versus dose becomes asymptotic. The pH is an indirect measurement of processing completion and is input to the fault detector to detect pH out of range of recipe.

In the majority of examples tested there was a decrease in pH with increased processing. Table 1 describes three Table 1 indicates results of 16×BLB, 50 ml air, 200 ml clear bottle, 25 degree Celsius, all sample processed together, Processor name '16×BLB'

TABLE 1

| Time [Hours] | pH Sample 1 | pH Sample 2 | pH Sample 3 |
| --- | --- | --- | --- |
| 0 | 4.08 | 4.42 | 4.60 |
| 2 | 4.06 | 4.40 | 4.59 |
| 4.5 | 4.04 | 4.38 | 4.57 |
| 8 | 4.01 | 4.36 | 4.55 |
| 12 | 3.99 | 4.35 | 4.53 |
| 16 | 3.96 | 4.34 | 4.52 |
| 20 | 3.94 | 4.33 | 4.51 |
| 24 | 3.92 | 4.32 | 4.51 |
| 28 | 3.90 | 4.31 | 4.51 |

Table 2 describes increasing pH with exposure, 60 ml Tequila, 60 ml clear bottle, 25 degree Celsius, pH and color difference from control, time in [Hours].

TABLE 2

| DEVICE | Time | pH diff. | color change | Taste Change |
|---|---|---|---|---|
| Control | 0.00 | | | |
| 66x450 | 2.00 | 0.00 | much lighter | much fruitier |
| 1K415 | 2.00 | 0.00 | slightly lighter | fruitier |
| 3x365 | 2.00 | 0.01 | about the same | smokier |
| 6xBLB | 2.00 | 0.03 | about the same | smokier |
| 16xBLB | 2.00 | 0.11 | about the same | much smokier |

Table 2 discloses the evidence that not in all cases is the pH an increasing or a suitable indicator. An example is a tequila that did not have a decreasing change in pH and the indicator of process was the color change. In this example color change is used to quantify the increased agave fruit flavors.

TABLE 3

Table 3: Names of Processor with varous characteristics all with average reflectivity of about 70 percent over the emitted wavelengths.

| Device Label | Approximate Peak Wavelength [nm] | Approximate Full Width Half Max [nanometers] | Approximate Processing Volume milliliters | Approximate Optical Power [WATTS] |
|---|---|---|---|---|
| 66x450 | 450 | 12 | 700 | 43 |
| 3x365 | 365 | 12 | 700 | 2 |
| 1Kx415 | 415 | 15 | 700 | 9 |
| 16xBLB | 365 | n/a | 1500 | 35 |
| 6xBLB | 365 | n/a | 1500 | 13 |

To increase the ethyl acetate concentration from about 45 milligrams per liter to about 64 milligrams per liter in a 60 ml sample of brandy with minimal headspace in a 60 ml clear bottle, perform the following method: a) at substantially room temperature and 1 atmosphere of pressure rinse a 60 a clean dry clear bottle with beverage, b) fill bottle to maximum capacity to reduce oxygen effects, c) expose the bottle with beverage to about 1.2 Watts of ultraviolet light from an light emitting diode with a peak wavelength of about 365 nanometers over a period of about 14 hours and 10 minutes in a chamber of about 700 milliliters volume and a reflectivity on average of about 70 percent over the range of emitted light.

Ethyl acetate is the ester of ethanol and acetic acid. Ethyl acetate is also referred to the systematic name of ethyl ethanoate. Many, but not all people, have an Ethyl acetate perception threshold concentration of about 120 milligrams per liter ("mg/L") in some common ethyl alcoholic beverages including, but not limited to, wine. The general population can be categorized by ranges of ethyl acetate concentration in foodstuffs. The present invention provides useful methods including, not limited to, exposing suitable foodstuffs to a dosage of light of a suitable wavelength capable of modifying ethyl acetate concentration in a suitable foodstuff.

The method to determine the completion of a processing batch is to first take a pH reading from unprocessed beverage, then iterate the step of processing the beverage and taking an additional pH reading, until stopping the processing when the difference between the initial pH reading and the current pH reading reaches the preferred difference.

Guaiacol is often said to produce a charred flavor Excess guaiacol is considered an off-flavor. To decrease the guaiacol concentration from about 148 micrograms per liter to about 64 micrograms per liter in a 60 ml sample of brandy with minimal headspace in a 60 ml clear bottle, perform the following method: a) at substantially room temperature and 1 atmosphere of pressure rinse a 60 a clean dry clear bottle with beverage, b) fill bottle to maximum capacity to reduce oxygen effects, c) expose the bottle with beverage to about 1.2 Watts of ultraviolet light from an light emitting diode with a peak wavelength of about 365 nanometers over a period of about 14 hours and 10 minutes in a chamber of about 700 milliliters volume and a reflectivity on average of about 70 percent over the range of emitted light.

Additional experiments were conducted and the pH decreased with actinic light exposure.

The different wavelength ranges produce different flavor responses in most but not all cases. For example, the blue wavelength ranges temp to produce less of an ethyl acetate flavor than violet, which produces less of an ethyl acetate flavor than lamps with a peak of about 365 nanometers. The different wavelength ranges also produce different changes in color as describe in Table 2.

Experiments indicate that more optical energy is required to effect a substantial change is a given beverage. For example, blue (peak at about 450 nm) light requires about 5 times more energy than violet (peak at about 400 nm), and violet requires about 5 times more energy than ultraviolet (peak at about 365 nm).

To produce a product with a smother, less harsh, less piquancy there is a benefit to reduce the amount of available oxygen which lowers the generation of aldehydes. A recipe which tends to reduce the harshness would reduce the aldehyde generation in the headspace by reducing the amount of available oxygen in the headspace. Aldehyde reducing headspace gas ("ARHG") includes combinations of one or more gases including, but not limited to, carbon-dioxide ("CO2"), gaseous nitrogen ("N2"), helium ("He"), or 1,1,1,2-tetraflouroethane ("CF3CH2F"). The ARGH would preferably have a dioxygen ("O2") concentration than is suitable for a preferred product. A lower O2 concentration tends to produce a smoother product.

Anosmics are people who require a higher concentration of irritants to pass a perception threshold for that particular irritant than for normal people. Anosmics who prefer a product with a higher piquancy may select a recipe that calls for a substantial concentration of available O2 in the headspace. Therefore, not all replacement headspace gases have a reduced or a substantially eliminated O2 concentration. The literature reports findings on the differences between normal and anosmic subjects perceptual thresholds are orders of magnitude higher.

The present invention provides methods to control the headspace gas during the processing.

The present invention comprising a solid catalyst that is incorporated into a removable surface area increases the reaction rate conversion of volatile organic compounds including, but not limited to, acrolein to propenoic acid.

The present invention is directed toward methods of modifying aldehydes or other irritants concentrations in the product. In a beverage there is normally a liquid and a gas phase. However, there are atypical conditions where there is only a liquid or a gas phase where the Processor is used.

A method of the present invention is to reduce or substantially eliminate the gas phase to by providing a variable volume container that expands or contracts to keep the gas phase minimal. To keep the pressure higher a mechanically translating volume in incorporated to adjust the pressure. Such a mechanically translating device comprising one or more of a mechanically translating component including, but not limited to, a flexible material, a balloon, a screw, displacement piston.

The displacement piston displaces the air in the bottle for a volume of material comprising a combination of one or more piston materials including, but not limited to, glass, metal, plastic, titanium, copper, Teflon. The surface of the displacement piston material has displacement piston properties including, but not limited to, a catalytic surface.

The displacement piston is capable of displacing substantially all of the gases in the headspace or a portion of the gases in the headspace in response to a operator preference control. The operator preference control may be manually implemented or part of an automatic control mechanism responsive to improve the probability of meeting recipe directions.

When the consumer preference is to increase the smoothness or decrease harshness the Processor user interface controls are set by the operator to reduce the concentration of aldehydes. The Processor reduces or substantially eliminates the oxygen in the headspace by combinations of one or more methods including, but not limited to modifying the headspace volume, modifying the headspace chemical composition, modifying the headspace temperature, modifying the headspace pressure.

If the recipe recommends a cooling mode the recipe may call for freezing the product and separating the product. An alternative embodiment of the present invention incorporates a cooling system capable of freezing a beverage. An alternative embodiment of the present invention incorporates a cooling system capable of separating a beverage.

A distillation column can be incorporated to control temperature and concentration of chemical constituents.

A continuous process includes a distillation tower and the Processor would be exposing light within the distillation tower.

The continuous process has at least one tank for reflow. To minimize the portion of the re-flow that has not been exposed to light, a second container is employed to receive the processed beverage. If there exists only one mechanically sound container, then the container may be partitioned to create more than one volume to store beverages in various stages of processing. The partition in the container may be combinations of one or more partition components including, but not limited to, flexible bags, translating container surfaces.

A pump is employed to move the product through the Processor's processing volume.

The Processor can also has multiple containers that are filled and held prior to emptying and receiving unprocessed product. By partitioning the product there is a direct correlation between processing time and volume. Even in a pipe with laminar and non-laminar flow there are portions of the product that will receive differing amounts of processing. Without partitioning there is a chance that a portion of the product will have too much or too little processing to meet the recipe. Some recipes have a more relaxed specification on the consistency of processing. Therefore, partitioning for a continuous process is optional. A method to determine the recipe is to process a sample and determine the results by taste and/or by analytical techniques.

Analytical techniques for process control include combinations of one or more analytical techniques including, but not limited to, gas chromatography ("GC"), liquid chromatography ("LC"), mass spectroscopy ("MS"), nuclear magnetic resonance ("NMR"). Different chemicals have differing useful detection techniques. Chemicals are hard to detect with direct measurement, and therefore may or may not be directly detected with analytical techniques. In some case, such as with aldehydes of low molecular weight, the solution would be reacted with chemicals to create derivative compounds that are more detectable. The present invention makes use of the analytical methods to provide information to control the Processor.

Example Carbon-dioxide in headspace. Carbon-dioxide was produced by collecting excess gassing from a 2000 milliliter ("ml") soda bottles in a plastic bag and subsequently injected into a headspace of about 40 ml over a sample of vodka of about 20 ml. Prior to processing the vodka had moderate to high piquancy taste and a harsh mouth-feel. [NAME THE Processor] Processing for 2 hours with a 1.5 watt optical power produced had a lower piquancy and smoother mouth-feel compared to the unprocessed vodka. The higher concentration of $CO_2$ in the head-space produced a flavor in the vodka resembling an pickled olive flavor.

A 1,1,1,2-Terafluoroethane process produced a sweet flavor.

Air headspace increased the piquancy and harsh mouth-feel. The color of a Canadian whiskey became much lighter.

Minimal headspace lowered the piquancy and harsh mouth-feel without adding additional flavors to the beverage. Blue light produces less change in the flavor while reducing the piquancy and harsh mouth-feel than Violet (315 nanometer ("nm") peak). Violet (315 nm peak) reduced the piquancy and harsh mouth-feel more than Blue and less than ultraviolet (365 nm peak). The 655 nm peak wavelength produced a palatable product with a smaller dose than violet. Violet produced a palatable product with a smaller dose than blue.

The term "dose" herein is referring to optical power applied to the target beverage. Dose is measured in Watts multiplied by the time in seconds to produce Joules. Available dose is different that absorbed dose. Available dose is the optical power emitted from the light sources that could be absorbed by the beverage. The absorbed dose for clear beverages is less than the absorbed dose for dark beverages. The optical properties of the chamber is a key property of the system. A higher reflective Processor is more efficient than a less reflective Processor for the same available dose. The efficiency of the system can be estimated by comparing the amount of available optical power required to produce a change compared to a semi-infinite bottle to produce the same change over a longer period of time. The semi-infinite bottle absorbs substantially all of the available light but is less practical for a low processing time. A semi-infinite bottle represents a maximum efficiency and more practical Processors would have a lower efficiency.

Red wine changes substantially on the order of exposure to about 50 KJ/L of light with a peak wavelength of 365 nanometers.

Distilled ethanolic beverages take substantially more power to effect a preferred change than wine. Distilled ethanolic beverages changes substantially on the order of exposure to about 400 KJ/L of light with a peak wavelength of 365 nanometers, whereas Violet light (peak 450 nm) requires about 2000 KJ/L, whereas Blue light (peak 450 nm) requires about 10000 KJ/L. More or less processing could be performed depending on recipe.

The available cooling capacity affects the time to apply the dose of light energy to the foodstuff. The more cooling available then the more intense the light can be applied. The intention of the invention is to reduce or substantially eliminate the effects of undesired chemical changes due to temperature on the beverage. In some cases specific temperatures are called for by the recipe which sets the requirement for cooling capacity required for the available light source. Unless otherwise noted, the examples described herein had sufficient cooling capacity to keep the temperature rise of the liquid under about 2 degrees Celsius.

Delay to start control. The controller has a all-systems-go mode of operation which requires the control inputs to be in an all-systems-go operating state to for processing. The allsystems-go operating state is a combination of one or more states of measurement inputs including, but not limited to, the ambient temperature is within a maximum and minimum for processing.

The present invention changes processing time to total dose based on light source intensity. Light source intensity signal is a combination of one or more light source intensity signal variables including, but not limited to, estimated lamp intensity, measured lamp intensity.

Wherein estimated lamp intensity is computed on a function of the lamp operating history of the lamps. Lamps intensity changes over time and each separate lamp would have a generic control history for the type of lamp and a specific control history for that particular lamp serial number.

Wherein actual lamp output is a measured variable and the processing time is adapted to control the total dose of the process.

Wherein total dose is controlled to meet a range of allowed spectral power and processing time as a function of spectral power intensity. The function can be a mathematical power series with variables of temperature, mass, spectral power.

Because having a clean surface of reflective walls and transmission through transparent walls increases efficiency of the processing there is a need to provide a Processor that can be cleaned by cleaning methods including, but not limited to, rinsing, washing with detergents.

To decrease the time to clean the surfaces separate chamber are supplied to the lamps and the processing chamber. The separate chamber for the lamps reduces contamination and decreases the need to clean the lamp chamber. An additional benefit of separate chambers is to keep the lamp material from contacting the foodstuff. An example is to reduce or substantially eliminate the possibility of mercury from a broken compact fluorescent lamp from contacting the foodstuffs or foodstuff bottle.

The distilled ethanolic beverages used in the examples disclosed herein have about 40% ethanol by volume unless otherwise noted. The wines described have about 14% ethanol by volume unless otherwise noted. The temperature of processing is about 25 degrees Celsius unless otherwise noted. The environmental pressure was about 1 atmosphere unless otherwise noted. Nominal shaking, stirring, and vibration were applied without excess.

What is claimed is:

1. An apparatus for light-processing a liquid comprising: a light chamber having a light source having peak wavelengths longer than 350 nm and no peak wavelengths shorter than 350 nm, wherein the chamber is shaped for receiving and enclosing a bottle containing the liquid and headspace above the liquid, wherein the liquid in the bottle is exposed to the ultraviolet light with a controlled oxygen concentration in the headspace.

2. The apparatus of claim 1 wherein the inner surface is comprised of a highly reflective material.

3. The apparatus of claim 2 wherein said highly reflective material is one of a metalized mylar film, a barium sulfate paint.

4. The apparatus of claim 1 incorporating one of a translucent air flow baffle and a translucent liquid barrier.

5. The apparatus of claim 2 wherein said highly reflective material is one of a ultraviolet transmitting acrylic.

6. The apparatus of claim 1 wherein the artificial light consists of a peak wavelength ranging between 355 nm and 400 nm inclusive.

7. The apparatus of claim 6 wherein the artificial light does not include a peak wavelength longer than 400 nm.

8. The apparatus of claim 7 wherein the bottle is a wine bottle.

9. The apparatus of claim 6 wherein the selected intensity and duration of the artificial light are such that the liquid is exposed to a total of between 5 kilojoules/liter and 2000 kilojoules/liter of photonic energy from the artificial light.

10. The apparatus of claim 1 further comprising a cooling system for cooling the lamps and/or liquid.

11. The apparatus of claim 10 wherein the cooling system can maintain the temperature of the liquid to less than 10 degrees Fahrenheit above ambient temperatures.

12. The apparatus of claim 11 further comprising a control system configured to activate the artificial light when the cooling system reaches a designated temperature.

13. The apparatus of claim 1 wherein the chamber comprises a catch basin adapted to catch spills from the bottle.

14. The apparatus of claim 1 further comprising a vacuum to remove headspace.

15. The apparatus of claim 1 further comprising a pH sensor.

16. An apparatus for light-processing a liquid, comprising: a light chamber having a light source having peak wavelengths longer than 350 nm and no peak wavelengths shorter than 350 nm, wherein the chamber is shaped for receiving and enclosing a vessel containing the liquid and headspace above the liquid, wherein the liquid in the vessel is exposed to the ultraviolet light with a controlled oxygen concentration in the headspace.

* * * * *